Feb. 12, 1957 R. C. HEIDEMAN 2,781,225
COMBINATION STROLLER AND BABY CARRIAGE
Filed Nov. 30, 1953 4 Sheets-Sheet 2

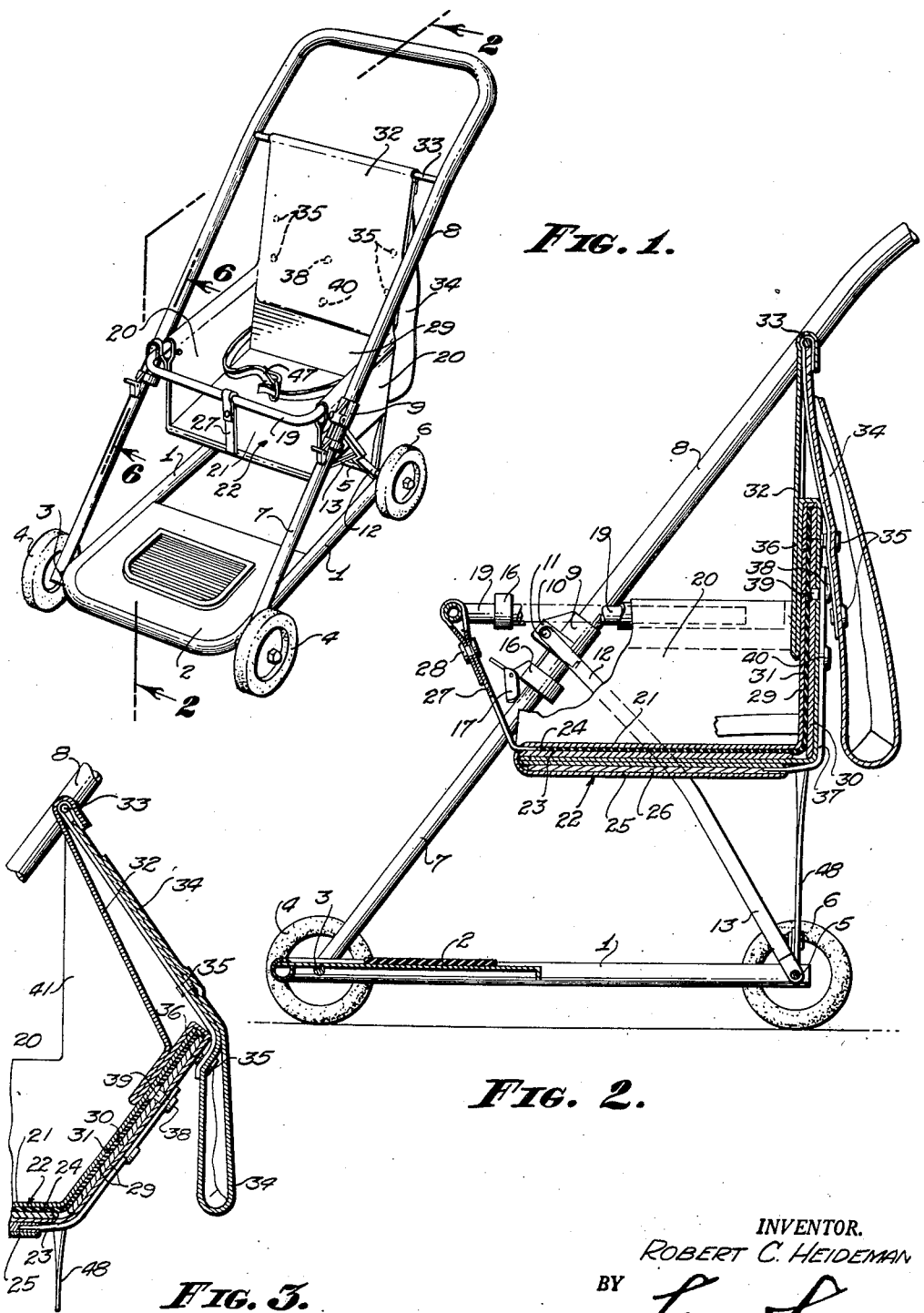

INVENTOR.
ROBERT C. HEIDEMAN
BY Lyon & Lyon
ATTORNEYS

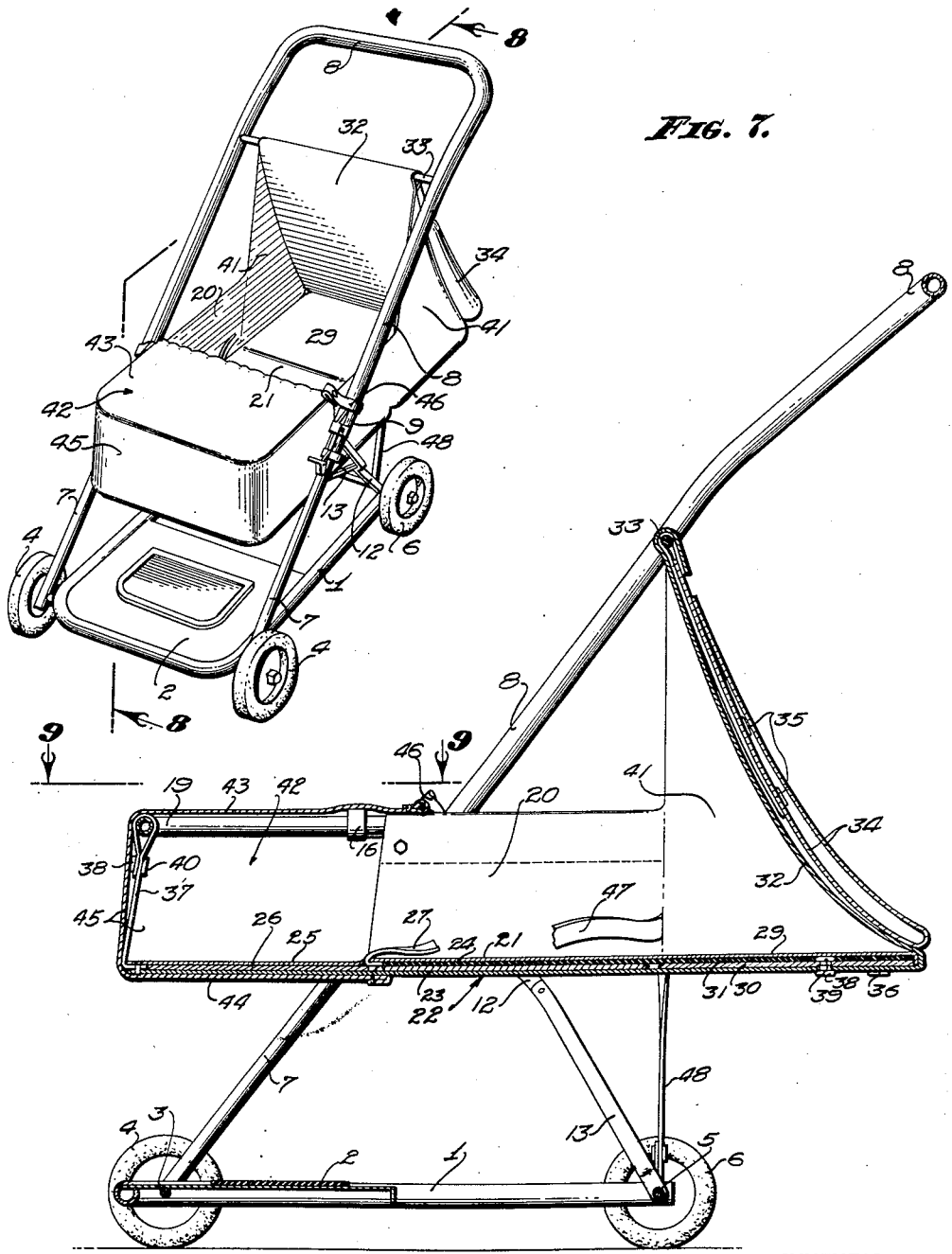

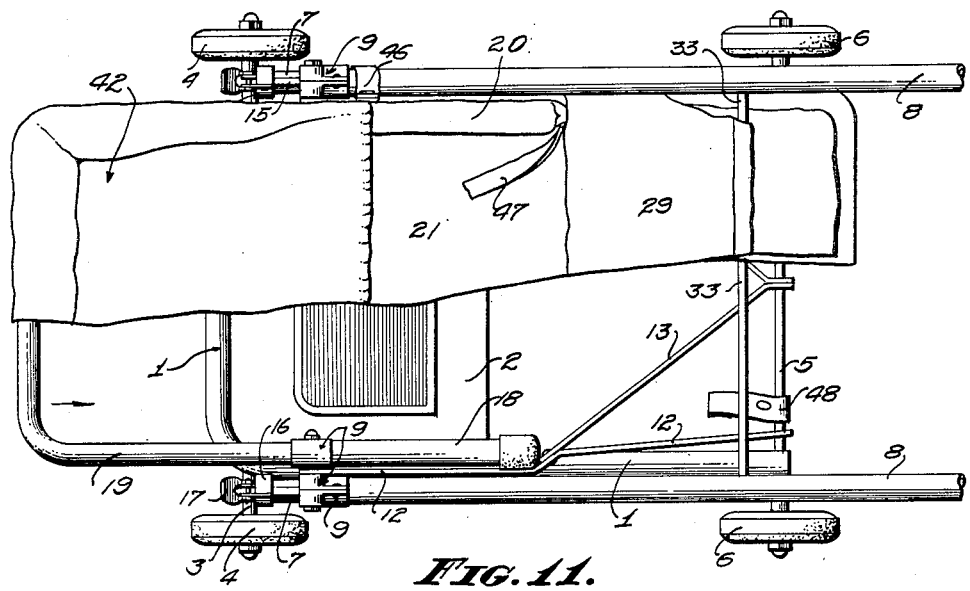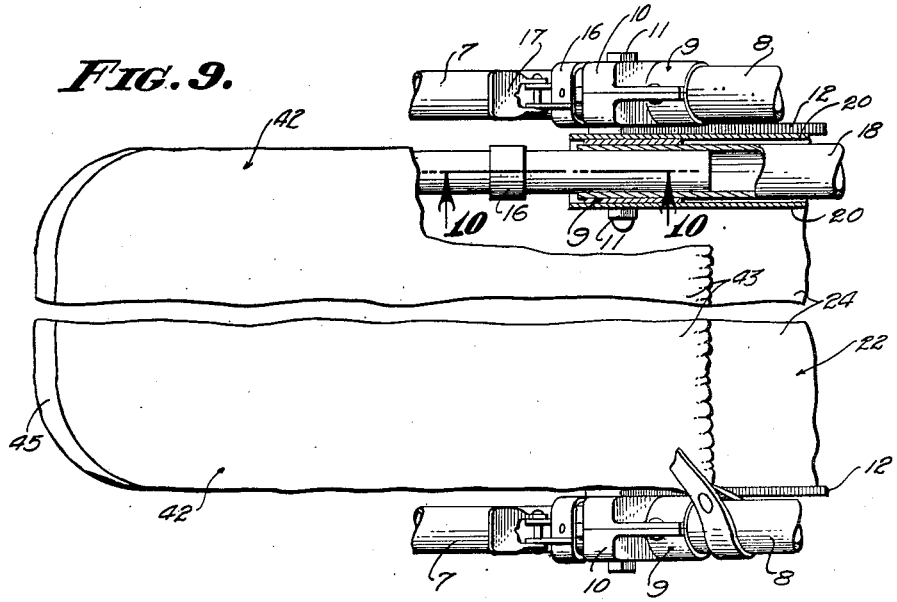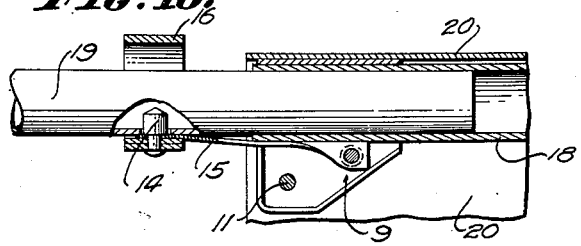

United States Patent Office 2,781,225
Patented Feb. 12, 1957

2,781,225
COMBINATION STROLLER AND BABY CARRIAGE

Robert C. Heideman, North Hollywood, Calif., assignor to American Carry-Products Company, Inc., North Hollywood, Calif., a corporation of California Application November 30, 1953, Serial No. 395,009

12 Claims. (Cl. 296—26)

My invention relates to combination stroller and baby carriages and included in the scope of my invention are:

First, to provide a combination stroller and baby carriage which utilizes the stroller construction disclosed in my Patent No. 2,616,718, issued November 4, 1952, entitled Foldable Baby Stroller, and with a minimum alteration in the construction of the stroller enable the stroller to be convertible into a baby carriage.

Second, to provide, in a combination of this class, a novel means whereby the seat of the stroller may be extended and the back rearranged to form a baby carriage.

Third, to provide a combination stroller and baby carriage which, whether in use as a stroller or baby carriage, may be readily folded into a compact structure for storage or transportation, or as readily opened for use.

Fourth, to provide a combination of this class which, by reason of its ready convertibility from a baby carriage to a stroller, and by reason of the nominal added cost of those elements which permits such conversion, a low cost carrier useful for a child from infancy to the age of several years is made possible.

With the above and other objects in view as may appear hereinafter, reference is directed to the accompanying drawings in which:

Figure 1 is a perspective view of my combination stroller and baby carriage shown arranged as a stroller;

Fig. 2 is an enlarged sectional view substantially in the plane 2—2 of Fig. 1;

Fig. 3 is a fragmentary sectional view in the same plane as Fig. 2 and showing particularly the back portion of the stroller seat adjusted to an inclined position;

Fig. 7 is a perspective view of my stroller and baby carriage shown arranged as a baby carirage;

Fig. 8 is a sectional view thereof in the plane 8—8 of Fig. 7;

Fig. 9 is an enlarged fragmentary plan view, taken from the plane 9—9 of Fig. 8;

Fig. 10 is a fragmentary sectional view through 10—10 of Fig. 9; and

Fig. 11 is a fragmentary plan view, showing the baby carriage in its collapsed position.

Figure 4:
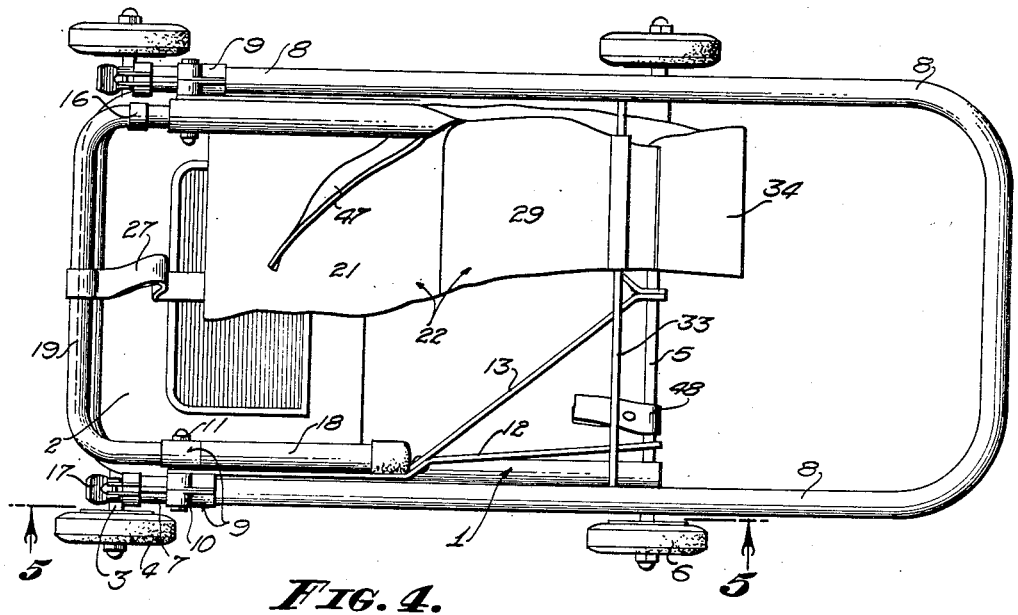
Fig. 4 is a fragmentary top or plan view of the stroller and baby carriage in its collapsed position for transportation or storage.

My combination stroller and baby carriage includes a base frame 1 in the form of tubing bent U-shaped, the cross portion forming the forward end of the frame. Fitted into and reinforcing the forward end of the base frame 1 is a platform 2. A front axle 3 extends transversely through the frame 1 adjacent its forward end and is equipped with front wheels 4. A rear axle 5 extends transversely across the rear extremity of the base frame 1 and is equipped with rear wheels 6.

Pivotally supported on the front axle 3, immediately outside the base frame 1, is a pair of tubular forward struts 7 which extend rearwardly and upwardly into the ends of a telescoping U-shaped handle frame 8. The lower forward extremities of the handle frame 8 are equipped with bracket fittings 9 in the form of sheet metal collars, each having a hollow boss 10 disposed at its upper side. The boss 10 receives bolts 11 which pivotally support the upper forward extremities of the rear struts 12, which extend downwardly and are joined to the rear axle 5 immediately within the extremities of the base frame 1. The rear struts 12 are bent longitudinally and are offset intermediate their ends to clear other portions of the frame structure and struts when the stroller and baby carriage is collapsed. Joined to the rear struts 12 intermediate their ends is a V-brace 13 which converges downwardly and rearwardly and is pivotally received at its apex by the rear axle 5.

Figure 5:
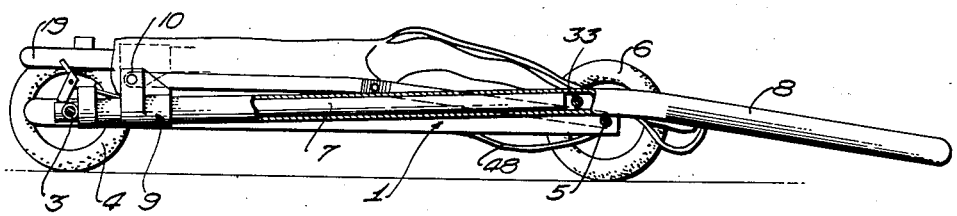
Fig. 5 is a side view thereof, partially in section, likewise showing the stroller and baby carriage in its collapsed position.
Figure 6:
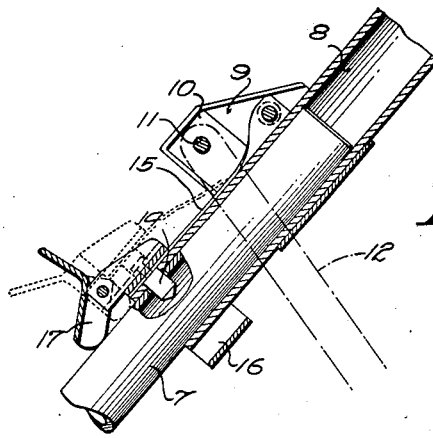
Fig. 6 is an enlarged fragmentary sectional view through 6—6 of Fig. 1, showing the manner in which the forward struts, rearward struts, and handle interconnect.

In order to secure the handle frame and forward struts in either their extended position, such as shown in Figs. 1 and 2, or in their collapsed position, such as shown in Figs. 4 and 5, there is provided a pair of latch pins 14, each carried at the end of a leaf spring 15 secured within the bracket 9, as shown in Fig. 6. The latch pins fit in appropriate openings provided in the forward struts 7. In order to manipulate the latch pins, the extremities of the leaf springs 15 are provided with bands 16 which loosely encompass the forward struts so that by pressing against the side of the band diametrically opposite from the latch pins they may be withdrawn from the forward struts. In order to retain the latch pins inoperative, levers 17 are provided which raise the latch pins from the struts, as shown by dotted lines in Fig. 6. It will be observed that the levers 17 are so arranged that upon extended movement of the handle frame 8 the levers 17 are caused to pivot in a direction to release the latch pins 14. The structure so far described is essentially the same as that disclosed in my previous patent, No. 2,616,718.

The bolts 11 also pivotally support a second pair of brackets 9 fitted on the ends of a pair of seat suspending bars 18. These bars are disposed between the extremities of the handle frame 8. A telescoping U-shaped cross frame 19 fits slidably into the seat suspending bars 18. One or both of the brackets 9 provided on the seat suspending bars 18 may be provided with a latch pin 14, leaf spring 15, and release band 16, as shown in Fig. 10, so that the cross frame 19 may be held in its retracted position shown in Figs. 1 and 2, or in its extended position shown in Figs. 7 and 8.

Supported from each bar 18 is a seat side panel 20 formed of cloth and having a hem at its upper portion which fits over the corresponding bar 18. The seat side panels are joined by the seat portion 21 of a folded sleeve 22. The sleeve 22 comprises upper and lower plies between the seat portion of which is fitted a stiffener panel 23 covered by padding 24. The folded sleeve 22 projects forwardly of the seat portion 21 to form an extension portion 25 having a stiffener panel 26 therein.

When my device is employed as a stroller, the extended portion 25 of the folded sleeve 22 underlies the seat portion 21, as shown in Fig. 2. At the forward margin of the seat portion 21 there is provided a seat strap 27 which extends upwardly and loops over the cross frame 19. The loop portion of the seat strap is secured by a separable fastener 28. The folded sleeve 22 extends rearwardly from the seat portion 21 to form a back portion 29 which receives a stiffener panel 30 covered by padding 31. Attached to the back portion 29 is a back extension 32 formed of cloth which extends upwardly and is provided with a hem at its extremity to receive a cross bar 33 extending between the side portions of the handle frame 8.

Also secured to the cross bar 33 or to the upper portion of the back extension 32 is a storage bag 34 which hangs behind the back portion 29. The storage bag is provided at its forward side and each lateral margin with a pair of separable fastener elements 35. The members of each pair of fastener elements 35 engage a mating fastener element 36 provided at the side margin of the back portion 29. When the uppermost of the fastener elements 35 engage the fastener elements 36, the back portion 29 is secured in an upright position, such as shown in Fig. 2. When the lowermost fastener elements 35 engage the fastener elements 36, the back portion 29 is disposed in an inclined position, such as shown in Fig. 3. The back extension 32 has sufficient excess length that the back portion may be lowered to a horizontal position, such as shown in Fig. 8, by release of the fastener elements 35 and 36.

In order to secure the forward extension portion 25 in its folded position shown in Fig. 2, there is provided a strap 37 attached to the extremity of the extension portion 25. The strap 37 is adapted to extend upwardly along the back side of the back portion 29 between the back portion and the storage bag 34. The extremity of the strap 37 is provided with a separable fastener element 38, which engages a mating element 39 secured to the back portion 29. The extension portion 25 may be pivoted from its position shown in Fig. 2 to a horizontal forwardly extending position, such as shown in Fig. 8. When this is done the telescoping cross frame 19 is extended and the strap 37 is looped over the cross portion of the frame 19. For this purpose the strap 37 is provided with a second mating fastener element 40 which coacts with the fastener element 38.

The seat side panels 20 have rearwardly extensible and foldable portions 41 which join to the margins of the back portion 29 and extend upwardly along the margins of the back extension 32, so that when the back portion is in its horizontal position shown in Fig. 8 the sides are enclosed.

In order to enclose the region between the cross frame 19 and the forward extension portion 25, a bag-like cover member 42 formed of cloth is provided. The cover member 42 includes a top portion 43, bottom portion 44, and sides 45. The cover member is adapted to be drawn over the cross frame 19 and under the extension portion 25. Its open end may be provided with suitable elastic means so that the cover member tends to remain in place. In addition, the open end of the cover member may have straps 46 provided with separable fasteners so that the straps 46 may be looped over the handle frame 8 adjacent the fittings 9.

Attached to the seat side panels 20 is a safety strap 47, capable of use whether the device be in the form of a stroller, such as shown in Fig. 1, or utilized as a baby carriage, as shown in Fig. 7.

In order to reinforce the extension 41 of the side panels and to retain the side bars 18 in a horizontal position, when the stroller or baby carriage is in use, flexible webbing 48 extends along the margins of the extension 41 from the cross bar 33 to the rear axle 5.

My combination stroller and baby carriage is converted from a stroller to a baby carriage as follows:

The seat strap 27 is released, the telescoping cross frame 19 is extended, and the strap 37 is released from the fastener element 38, so that the extension portion 25 may be pivoted from its folded position shown in Fig. 2 to its extended position shown in Fig. 8, whereupon the strap 37 is looped over the telescoping cross frame 19 and the fastener elements 38 and 40 joined together. The fastener elements 35 and 36 are released so that the back portion 29 may be inclined, as shown in Fig. 3, or disposed horizontally, as shown in Fig. 8. The cover member 42 is then slipped over the telescoping cross frame 19 and secured by the straps 46 to complete the baby carriage.

Whether the device be in the form of a stroller or baby carriage it is collapsed in the same manner, that is, the latch pins 14 are released so that the forward struts 7 may telescope into the handle frame 8, causing the struts and frames to fold into the position shown in Figs. 4 and 5, or in Fig. 11. It will be observed that except for the forward projection of the cross frame 19, the baby carriage, when collapsed, is in the same condition as the stroller when collapsed. If it is desired to further collapse the baby carriage, this is merely a matter of removing the cover member 42, releasing the strap 37, and telescoping the extension portion 25.

Having fully described my invention, it is to be understood that I do not wish to be limited to the details herein set forth but my invention is of the full scope of the appended claims.

I claim:

1. A combination stroller and baby carriage, comprising: a wheel supported base frame; forward and rearward struts pivotally connected to said base frame; means relatively securing said struts to form with said base frame substantially triangular frame structures; parallel, forwardly and rearwardly extending seat suspension members connected to said frame structures substantially at the apices of said frame structures in the region of said means; an extensible frame joining said suspension members and movable between a forward extended position and a rearward retracted position; a seat structure supported from said seat suspension members and movable between a folded seat forming position and an extended bed forming position; and releasable fastening means for suspending the forward end of said seat from said extensible frame when said frame is extended and said seat is in its bed forming position.

2. A combination stroller and baby carriage, comprising: a pair of foldable substantially triangular frame structures having upwardly directed apices; a pair of parallel, forwardly and rearwardly directed suspension members connected to said frame structures at said apices; an extensible frame joining said suspension members and movable between a forward extended position and a rearward retracted position; a seat structure suspended between said suspension members and movable between a folded seat forming position and an extended bed forming position; and means operable, when said seat is in its bed forming position and said frame is in its extended position, to suspend the forward position of said seat from said frame.

3. A combination stroller and baby carriage, comprising: a pair of foldable substantially triangular frame structures having upwardly directed apices; a pair of parallel, forwardly and rearwardly directed suspension members connected to said frame structures at said apices; an extensible frame joining said suspension members and movable between a forward extended position and a rearward retracted position; a seat structure including a seat panel suspended between said suspension members, an extension panel hinged to said seat panel movable between a folded position relative to said seat panel and a coplanar position, and a back panel also hinged to said seat panel and movable between an upright and a horizontal coplanar position; means operable, when said extensible frame is extended and said extension panel is in its coplanar position, to suspend said extension panel from said extension frame; and means for retaining said back panel in its upright and coplanar positions.

4. A combination stroller and baby carriage, comprising: a pair of foldable substantially triangular frame structures having upwardly directed apices; a pair of parallel, forwardly and rearwardly directed seat suspension members disposed at said apices; means for retaining said seat suspension members in a substantially horizontal position; an extension frame telescopically fitting said suspension members and movable between an extended and a retracted position; a seat panel suspended from said suspension members and extension frame when said extension frame is retracted; a forward extension panel hinged to said seat panel and movable between a folded position and a horizontally extended position; and means for securing said forward extension panel in its folded position and in its extended position, said means adapted to release said extension panel from its folded position and secure said panel to said extension frame for suspension therefrom when said extension frame is extended.

5. A combination stroller and baby carriage, comprising: a pair of foldable substantially triangular frame structures having upwardly directed apices; a pair of parallel, forwardly and rearwardly directed seat suspension members disposed at said apices; means for retaining said seat suspension members in a substantially horizontal position; an extension frame telescopically fitting said suspension members and movable between an extended and a retracted position; a seat panel suspended from said suspension members and extension frame when said extension frame is retracted; a forward extension panel hinged to said seat panel and movable between a folded position and a horizontally extended position; means operable, when said forward extension panel is in its extended position and said frame is also in its extended position, to suspend said extension panel from said extension frame; a back panel hinged to said seat panel and movable between an upright and a horizontal position; and means for securing said back panel in an upright and in a horizontal position.

6. A combination stroller and baby carriage, comprising: a pair of foldable substantially triangular frame structures having upwardly directed apices; a handle structure extending upwardly and rearwardly from said frames; a pair of horizontally extending, parallel tubular seat suspension members disposed at said apices; a U-shaped extension frame having legs telescopically fitting said suspension members and movable between an extended and a retracted position; a seat panel suspended from said suspension members and extension frame when said extension frame is retracted; a forward extension panel hinged to said seat panel and movable between a folded position and a horizontally extended position; and a strap and fastening elements for securing said forward extension panel in its folded position and in its extended position, said strap adapted to loop over said extension frame.

7. A combination stroller and baby carriage, comprising: a pair of foldable substantially triangular frame structures having upwardly directed apices; a handle structure extending upwardly and rearwardly from said frames; a pair of horizontally extending, parallel tubular seat suspension members disposed at said apices; a U-shaped extension frame having legs telescopically fitting said suspension members and movable between an extended and a retracted position; a seat suspended from said suspension members and extension frame when said extension frame is retracted; a forward extension panel hinged to said seat panel and movable between a folded position and a horizontally extended position; a strap and fastening elements for securing said forward extension panel in its folded position and in its extended position, said strap adapted to loop over said extension frame; a back panel hinged to said seat panel and movable between an upright and a horizontal position; and means suspended from said handle structure for securing said back panel in its upright and its horizontal position.

8. In a baby stroller having a collapsible frame structure including a seat panel suspended between suspension members, the combination of: an extension frame telescopically connected with said suspension members; a forward extension panel hinged to said seat panel and movable between a folded position and a horizontally extended position; and means for securing said forward extension panel in its folded position and in its extended position, said means adapted to release said extension panel from its folded position and secure said panel to said extension frame for suspension therefrom when said extension frame is extended.

9. In a baby stroller having a collapsible frame structure including a seat panel suspended between suspension members, the combination of: an extension frame telescopically connected with said suspension members; a forward extension panel hinged to said seat panel and movable between a folded position and a horizontally extended position; means operable, when said forward extension panel is in its extended position and said extension frame is also in its extended position, to suspend said extension panel from said extension frame; a back panel hinged to said seat panel and movable between an upright and a horizontal position; and means for securing said back panel in an upright and in a horizontal position.

10. A combination stroller and baby carriage, comprising: a pair of foldable substantially triangular frame structures having upwardly directed apices; a pair of parallel, forwardly and rearwardly directed seat suspension members disposed at said apices; means for retaining said seat suspension members in a substantially horizontal position; an extension frame telescopically fitting said suspension members and movable between an extended and a retracted position; a seat panel suspended from said suspension members and extension frame when said extension frame is retracted; a forward extension panel hinged to said seat panel and movable between a folded position and a horizontally extended position; means operable, when said forward extension panel is in its extended position and said frame is also in its extended position, to suspend said extension panel from said extension frame; and a cover member operable, when said extension frame and panel are extended, to enclose said extension frame and panel.

11. A combination stroller and baby carriage, comprising: a pair of foldable substantially triangular frame structures having upwardly directed apices; a handle structure extending upwardly and rearwardly from said frames; a pair of horizontally extending, parallel tubular seat suspension members disposed at said apices; a U-shaped extension frame having legs telescopically fitting said suspension members and movable between an extended and a retracted position; a seat panel suspended from said suspension members and extension frame when said extension frame is retracted; a forward extension panel hinged to said seat panel and movable between a folded position and a horizontally extended position; a strap and fastening elements adapted, when said forward extension panel is in its extended position and said frame is also in its extended position, to support said forward extension panel; and a cover member operable, when said extension frame and panel are extended, to enclose said extension frame and panel.

12. In a baby stroller having a collapsible frame structure including a seat panel suspended between suspension members, the combination of: an extension frame telescopically connected with said suspension members; a forward extension panel hinged to said seat panel and movable between a folded position and a horizontally extended position; means for securing said forward extension panel in its folded position and in its extended position, said means adapted to suspend said extension panel from said extension frame; and a cover member operable, when said extension frame and panel are extended, to enclose said extension frame and panel.

References Cited in the file of this patent
UNITED STATES PATENTS

| | | |
|---|---|---|
| Re. 23,488 | Raucher | Apr. 29, 1952 |
| 201,043 | Pearce | Mar. 5, 1878 |
| 1,870,983 | Berman | Aug. 9, 1932 |
| 2,616,718 | Heideman | Nov. 4, 1952 |